United States Patent
Swanson et al.

(10) Patent No.: US 7,374,735 B2
(45) Date of Patent: May 20, 2008

(54) METHOD FOR NITROGEN OXIDE REDUCTION IN FLUE GAS

(75) Inventors: Larry William Swanson, Laguna Hills, CA (US); Wei Zhou, Foothill Ranch, CA (US); David Kelly Moyeda, Laguna Hills, CA (US); Roy Payne, Mission Viejo, CA (US)

(73) Assignee: General Electric Company, Schenectady, NY (US)

( * ) Notice: Subject to any disclaimer, the term of this patent is extended or adjusted under 35 U.S.C. 154(b) by 576 days.

(21) Appl. No.: 10/454,597

(22) Filed: Jun. 5, 2003

(65) Prior Publication Data

US 2004/0244367 A1 Dec. 9, 2004

(51) Int. Cl.
*B01D 53/56* (2006.01)
(52) U.S. Cl. .................................................. 423/235
(58) Field of Classification Search ................ 423/235, 423/239.1, 246, 247
See application file for complete search history.

(56) References Cited

U.S. PATENT DOCUMENTS

| | | | |
|---|---|---|---|
| 4,250,820 A | 2/1981 | Lautenschläger | |
| 4,253,409 A | 3/1981 | Wormser | |
| 4,501,204 A | 2/1985 | McCartney et al. | |
| 4,532,872 A | 8/1985 | Anderson | |
| 4,699,071 A | 10/1987 | Vier et al. | |
| 4,739,713 A | 4/1988 | Vier et al. | |
| 4,915,039 A | 4/1990 | Ringel | |
| 4,926,765 A | 5/1990 | Dreizler et al. | |
| 5,085,674 A | 2/1992 | Leavitt | |
| 5,139,755 A * | 8/1992 | Seeker et al. | 423/235 |
| 5,154,599 A | 10/1992 | Wunning | |
| 5,195,450 A | 3/1993 | Marion | |
| 5,347,958 A | 9/1994 | Gordon, Jr. | |
| 5,425,317 A | 6/1995 | Schaub et al. | |
| 5,536,482 A * | 7/1996 | Diep et al. | 423/235 |
| 5,626,088 A | 5/1997 | Hiltunen et al. | |
| 5,915,310 A | 6/1999 | Hura et al. | |
| 5,934,892 A | 8/1999 | Rabovitser et al. | |
| 5,937,772 A | 8/1999 | Khinkis et al. | |
| 5,967,061 A | 10/1999 | Ashworth et al. | |
| 6,039,560 A | 3/2000 | Kubota | |
| 6,048,510 A * | 4/2000 | Zauderer | 423/235 |
| 6,058,855 A | 5/2000 | Ake et al. | |
| 6,199,494 B1 | 3/2001 | Griffin | |
| 6,206,685 B1 | 3/2001 | Zamansky et al. | |
| 6,244,200 B1 | 6/2001 | Rabovitser et al. | |
| 6,280,695 B1 | 8/2001 | Lissianski et al. | |
| 6,318,277 B1 | 11/2001 | Kokkinos | |
| 6,325,002 B1 | 12/2001 | Ashworth | |
| 6,325,003 B1 | 12/2001 | Ashworth | |

FOREIGN PATENT DOCUMENTS

| | | |
|---|---|---|
| WO | WO 97/25134 | 7/1997 |
| WO | WO 200021647 A1 * | 4/2000 |

OTHER PUBLICATIONS

U.K. Search Report for GB0412032.5.
Vitali V. Lissianski et al, "Optimization of Advanced Reburning Via Modeling", presented at the 28th Symposium (International) on Combustion, University of Edinburgh, Scotland, Jul. 30-Aug. 4, 2000, pp. 1-9.

* cited by examiner

*Primary Examiner*—Edward M. Johnson
(74) *Attorney, Agent, or Firm*—Nixon & Vanderhye P.C.

(57) ABSTRACT

A method of decreasing the concentration of nitrogen oxides in a combustion gas flowing through a vessel including the steps of: generating a flue gas in a combustion zone of the vessel, the flue gas containing nitrogen oxides and carbon monoxide; providing overfire air into a burnout zone of the vessel from a first injector of the overfire air to oxidize at least some of the carbon monoxide in the flue gas; injecting a selective reducing agent concurrent with the overfire air at a level in the burnout zone downstream of the first injector of overfire air and downstream of the oxidization of the carbon monoxide; and reacting the selective reducing agent with the flue gas to reduce the nitrogen oxides.

17 Claims, 2 Drawing Sheets

METHOD FOR NITROGEN OXIDE REDUCTION IN FLUE GAS

BACKGROUND OF THE INVENTION

This invention relates generally to reducing emission of nitrogen oxides from combustion systems, such as boilers, furnaces and incinerators.

A group of air pollutants produced by combustion in boilers and furnaces include oxides of nitrogen, mainly NO and $NO_2$. Nitrogen oxides ($No_x$) are the subject of growing concern because of their toxicity and their role as precursors in acid rain and photochemical smog processes. Reduction of nitrogen oxides has been the focus of many technology development efforts.

In modern boilers and furnaces and other such combustion vessels, emissions of nitrogen oxides ($NO_x$) have been greatly reduced by the use of overfire air ("OFA") technology. In this technology, most of the combustion air goes into the combustion chamber together with the fuel, but addition of a portion of the combustion air is delayed to yield oxygen lean conditions initially and then to facilitate combustion of CO and any residual fuel.

Selective Non-Catalytic Reduction ("SNCR") technologies reduce $NO_X$ in combustion gas by injecting a nitrogenous reducing agent ("N-agent"), such as ammonia or urea, into the gas. The N-agent is injected at high temperature and under conditions such that a non-catalytic reaction selectively reduces $NO_X$ to molecular nitrogen. Reduction of $NO_X$ is selective because the molecular nitrogen in the combustion gas is not reduced, while the $NO_X$ is reduced by the N-agent.

The N-agent is typically released into flue gas that is within an optimum temperature range or window, such as between 1700 degrees to 2200 degrees Fahrenheit (930 to 1200 degree Celsius). The flue gas often has moderate to high carbon monoxide (CO) concentrations (0.2-1.0 percent). In some SNCR applications, the CO in flue gas chemically competes with the active species in the N-agent needed for $NO_X$ reduction. This competition reduces the effectiveness of the SNCR process and $NO_X$ reduction, and/or moves the optimum temperature window to lower temperatures.

Earlier SNCR techniques circumvented the CO problem by spraying large N-agent droplets into overfire air injected into the flue gas. As the OFA and flue gas steams mix, CO is oxidized and water in the droplets evaporates as the droplets are carried to cooler regions of the boiler. This process delays the release of the N-agent until the gas temperature has reached the optimal temperature window.

Large droplet N-agent systems have difficulties that can reduce their effectiveness such as: long droplet residence times in the flue gas, a tortuous flow path with obstructions for the droplets, and a narrow N-agent release temperature window. If the droplets are too small, they release the N-agent upstream of the optimal temperature window where the flue gas is still too hot and render the N-agent ineffective. Under these conditions, the N-agent can generate (rather than reduce) $NO_X$. On the other hand, if the droplets are too large, a portion of the N-agent is released after the combustion gas has cooled below the optimal temperature window causing high ammonia concentrations (ammonia slip) in the flue gas outlet stream. Finally, there is a need for better SNCR techniques to address the problems raised by high CO concentrations in the flue gas near the droplet injection location.

SUMMARY OF THE INVENTION

In one embodiment, the invention is a method of decreasing the concentration of nitrogen oxides in a combustion gas flowing downstream through a vessel, comprising: generating a flue gas in a combustion zone of the vessel, the flue gas partly composed of nitrogen oxides and carbon monoxide; injecting overfire air into a burnout zone of the vessel from a first source of overfire air to oxidize at least some of the carbon monoxide in the flue gas; spraying a selective reducing agent concurrently with overfire air into a burnout zone downstream of the first source of overfire air and downstream of the oxidization of the carbon monoxide; and reacting the selective reducing agent with the flue gas to reduce the nitrogen oxides.

In a second embodiment, the invention is a combustion vessel having a combustion zone; a burnout zone downstream of the combustion zone; an overfire air compartment adjacent the burnout zone, wherein the overfire air compartment has an upstream air injector and a downstream air injector, and at least one agent injector for injecting a selective reducing agent into the burnout zone wherein the agent injector is placed in the air injector.

DETAILED DESCRIPTION OF THE INVENTION

Figure 1:
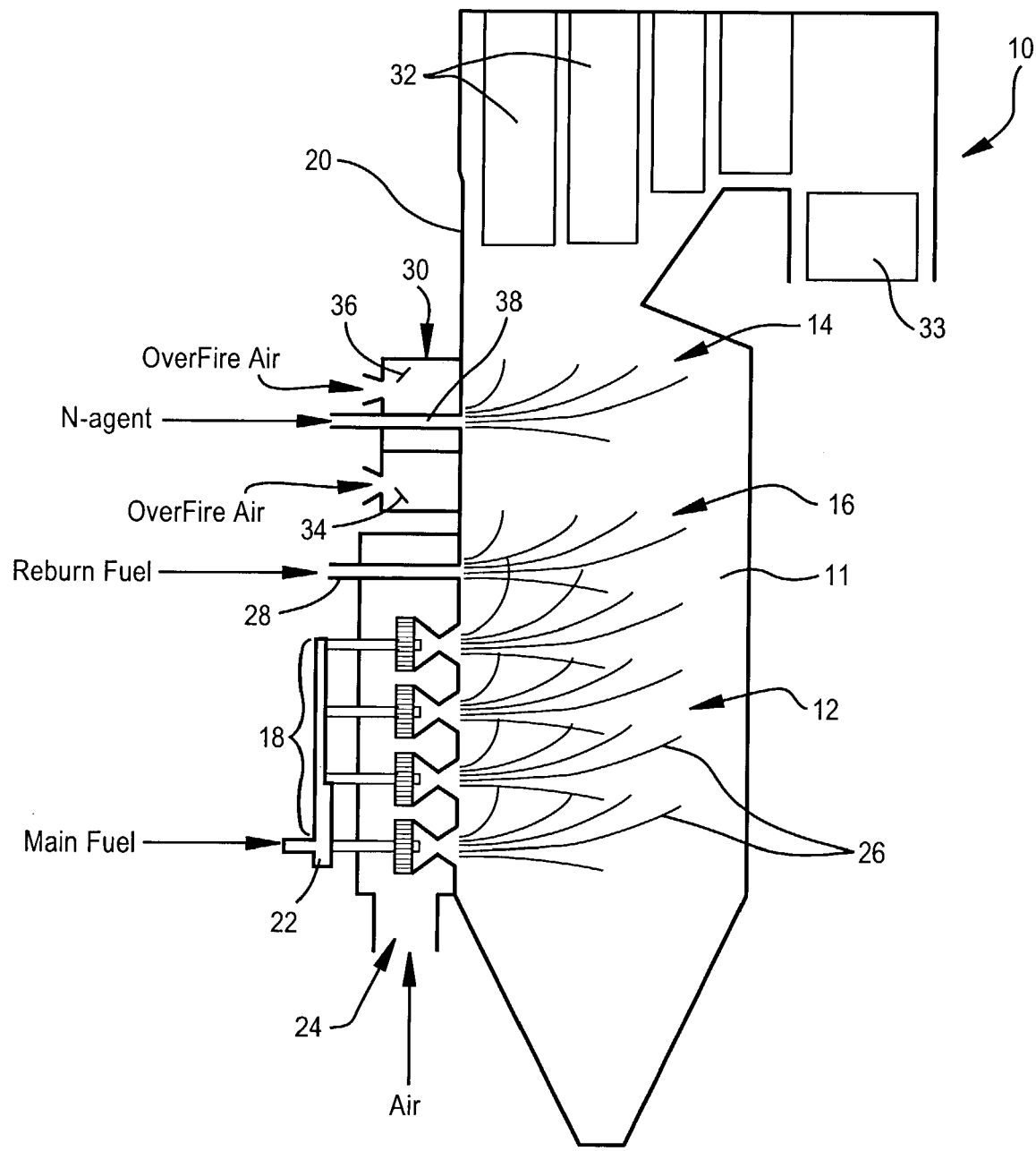
FIG. 1 is a schematic diagram of a coal-fired combustion vessel.

FIG. 1 a schematic representation of a combustion system 10 such as that used in a coal-fired boiler or furnace. The combustion system 10 includes a combustion vessel 11 having a combustion zone 12, a burnout zone 14 and an optional reburning zone 16. The combustion zone 12 includes one or more main burners 18 mounted on at least one of the walls 20 of combustion vessel 11. The walls form a vertical chamber for the combustion zone 12, reburning zone 16, burnout zone 14 and other components in the flue gas stream of the system 10.

The main burners are supplied with a main fuel, such as coal, directly or through a fuel manifold 22 and with air directly or through an air box 24. The air box may be mounted on the outside of the walls 20 opposite to the combustion zone 12 inside the vessel. The air box is a manifold that distributes air to each of the burners.

Combustion of the fuel injected by the main burners 18 and air from the air box 24 occurs in the combustion zone 12 of the vessel. The flue gas 26 produced by the combustion flows in a downstream direction that is upward from the combustion zone 12 to the burnout zone 14 in the vessel 11. The main burners supply the heat energy input into the vessel. Additional heat may be released into the vessel 11 at the reburning zone 16 where a reburn fuel, such as natural gas, is combusted. The reburn fuel enters the vessel 11 through a reburn fuel injector 28.

Downstream of reburning zone 16 is the burnout zone 14 where overfire air enters the vessel 11 through an overfire air injector 30. Downstream of the burnout zone in the vessel 11, the flue gas 26 optionally passes through a series of heat exchangers 32. Solid particles remaining in the flue gas may be removed by a particulate control device 33, such as an electrostatic precipitator ("ESP") or baghouse.

A selective reducing agent (N-agent) is sprayed into the burnout zone 14 with the overfire air. An N-agent injector (nozzle and lance) is placed in the overfire air chamber 30 and injects the selective reducing agent into the burnout zone 14 along with overfire air. As used herein, the terms "selective reducing agent" and "N-agent" are used interchangeably to refer to any of a variety of chemical species capable of selectively reducing $NO_X$ in the presence of oxygen in a combustion system. In general, suitable selective reducing agents include urea, ammonia, cyanuric acid, hydrazine, thanolamine, biuret, triuret, ammelide, ammonium salts of organic acids, ammonium salts of inorganic acids, and the like. Specific examples of ammonium salt reducing agents include, ammonium sulfate, ammonium bisulfate, ammonium bisulfite, ammonium formate, ammonium carbonate, ammonium bicarbonate, ammonium nitrate, and the like. Mixtures of these selective reducing agents can also be used. The selective reducing agent is provided in a solution, preferably an aqueous solution, or in the form of a powder. One selective reducing agent is urea in aqueous solution.

Figure 2:
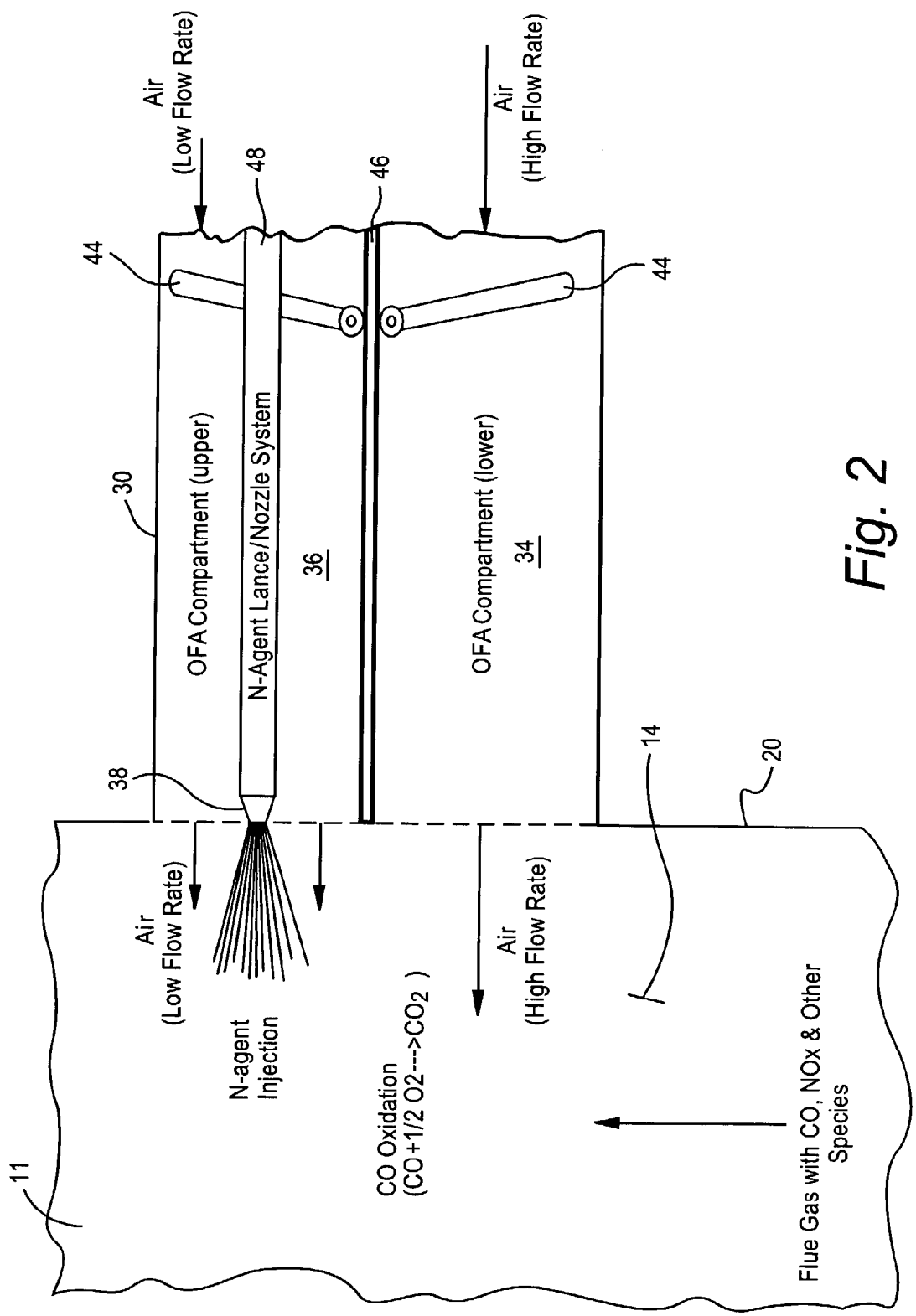
FIG. 2 is a schematic diagram of a multi-compartment overfire chamber for the vessel shown in FIG. 1.

As shown in FIG. 2, the overfire air input chamber 30 includes a plurality of OFA injectors 34, 36. These injectors are in regions of the chamber 30 from which overfire air flows through the wall 20 and into the burnout zone 14 of the vessel 11. The overfire chamber 30 is attached to the wall 20 of the vessel.

The OFA injectors of the chamber 30 are arranged vertically one over the other on the wall 20 of the vessel. A lower OFA injector 34 (upstream injector in flue gas) of the chamber 30 is a conduit that provides air, e.g., at a high flow rate, into the burnout zone 14. An upper OFA injector 36 (downstream injector in flue gas) of the chamber 30 also provides air to the burnout zone. The overfire air supplied by the downstream injector may be at a reduced flow rate than the air flowing through the upstream injector. Each of the OFA injectors may have walls that define an air conduit through which air flows to the wall 20 of the vessel, through penetrations in the wall and into the burnout zone 14 of the vessel.

A separator plate 46 in the chamber 30 may provide a wall separating the upper and lower OFA injectors. However, a separator plate may not be needed if the OFA injectors are not contained in one air input chamber 30, but are separated from one another with some of the vessel wall 20 between the OFA injectors. There may be more than two OFA air injectors, but the injector furthest downstream will generally include the N-agent injector. For example, two or more upstream OFA injectors may supply air to the burnout zone 14 and a final downstream OFA injector with an N-agent injector may supply both overfire air and the N-agent to the burnout zone 14.

The air from the upstream injector reduces the CO concentration in the burnout zone 14, before the N-agent is released. Air from the downstream injector 36 flows into the burnout zone 14 with the droplets containing the N-agent. The air mass flow through the upstream OFA injector(s) may be substantially greater than the mass flow through the downstream OFA injector. The flow rates of air through each of the injectors may be controlled to regulate the amount of overfire air flowing into the vessel. Adjustable dampers 44 in each of the injectors 34, 36 may be used to regulate the amount of air flowing through each injector. Similarly, fans may be positioned in the overfire chamber 30 upstream of the injector and used to move air into the overfire chamber at control flow rates.

N-agent nozzles 38 spray the N-agent into the burnout zone. Each N-agent nozzle 38 is placed at the end of a lance 48 that extends through the downstream overfire air injector in the overfire chamber 30. There may be a plurality e.g., three or four, of the agent injectors and lances arranged in the wall 20 and through the downstream OFA injector 36. N-agent is introduced into the burnout zone 14 through the N-agent nozzle 38 concurrently with the air flowing through the downstream OFA injector 36. The N-agent flows downstream as the OFA mixes with the combustion gas 26. Once released, the N-agent chemically reacts with combustion gas to reduce the $NO_X$ emissions.

Flue gas 26, with moderate to high CO concentrations, flows upward from the combustion zone into the burnout zone 14 where they initially mix with the overfire air from the lower compartment 34 and subsequently mix with the N-agent and overfire air from the upper compartment 36. The carbon monoxide (CO) in the flue gas flowing from the combustion and reburning zones 12, 16 is oxidized in the burnout zone 14 by the air flowing from the lower compartment 34 of the overfire chamber 30. Oxygen ($O_2$) in the air reacts with the CO to form carbon dioxide. The oxidation of the CO occurs in the burnout zone 14 upstream (below) the level where the N-agent is injected.

By injecting air into the vessel through the upstream injector 34 that is below the N-agent injector 38, a substantial portion of the carbon monoxide in the flue gas 26 is oxidized before the gas comes into contact with the N-agent. The oxidization of the CO upstream of the N-agent injection location may allow the N-agent to be sprayed into the flue gas with smaller droplets sizes reducing droplet residence times in the flue gas.

Airflow rates in the upper and lower injectors 34, 36 are adjusted to shield the N-agent from the flue gas until a sufficient amount of the flue gas CO is oxidized by the air from the lower compartment 34. This usually requires that more air flow through the upstream injector 34 than the downstream injector 36. For example, the air mass flowing through the upstream injector 34 may be four to ten times the air mass flowing through the downstream injector 36. The low CO concentration in the flue gas that contacts the N-agent improves N-agent effectiveness by reducing the competition between CO and $NO_X$ for active species critical to SNCR $NO_X$ reduction chemistry.

The N-agent injector 38 may be a nozzle at the end of a lance 48 that extends through the downstream injector 36. An input end of the lance, opposite to the nozzle 38, is coupled to a source of the N-agent. There may be multiple agent nozzles and lances for N-agent injectors arranged in the upper chamber and along the wall 20 of the vessel 11. The N-agent injector may be positioned at a level of the vessel 11 corresponding to a desired temperature of the flue gas in the burnout zone. For example, the agent injector 38 may be at a level where the temperature of the flue gas is in a range of 1,700 to 2,500 degrees Fahrenheit. The N-agent nozzle 38 may inject small droplets or gas of N-agent into the burnout zone. The small droplets release the N-agent to the combustion gas quicker than do larger droplets.

Pilot-scale field tests have demonstrated the negative effect that CO in combustion gas has on SNCR $NO_X$ reduction chemistry. The presence of 2000 parts-per-million (ppm) of CO in the combustion gas has been shown to effectively eliminate the $NO_X$ reduction achieved with N-Agent injection. For example, pilot-scale field tests conducted on a 300 kW (kilowatt) cylindrical coal-fired furnace indicate that the N-agent reduces $NO_X$ in combustion gas by 6 to 25 percent when CO is not present in the flue gas.

However, the $NO_X$ reduction due to the N-agent becomes negligible when CO at 2000 ppm is present in the flue gas. Accordingly, reduction of CO in the combustion gas is a factor that improves $NO_X$ reduction when using SNCR technology.

Computational Fluid Dynamic (CFD) computer simulations of a typical boiler furnace demonstrated that to reduce $NO_X$ by injecting an N-agent in overfire air, the temperature of the combustion gas entering the burnout zone should be in the temperature range from 1700 degrees to 2500 degrees Fahrenheit. The N-agent should be injected as small droplets into the gas and a split flow overfire air chamber 30 should provide substantially greater air mass flow through a lower compartment 34 than through the upper compartment 36. The split in the air mass flow between the upstream and downstream compartments in the overfire chamber may be as great as 10 to 1, where this ratio means that ten times as much air mass flows through the lower compartment as flows in the upper compartment. The CFD results showed that $NO_X$ was reduced by 21 percent when the air mass split was 4 to 1, and $NO_X$ was reduced by 35 percent when the air mass split was 10 to 1. The relative adjustment of the air flow rate may be performed by moving dampers 44 in the upper and lower injectors, or adjusting the speed of fans driving air into the upper and lower injectors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of decreasing the concentration of nitrogen oxides in a combustion gas flowing through a vessel, said method comprising:
   a) generating a flue gas in a combustion zone of the vessel, the flue gas containing nitrogen oxides and carbon monoxide;
   b) providing initial overfire air into a burnout zone of the vessel from a first injector of the overfire air to oxidize at least some of the carbon monoxide in the flue gas;
   c) injecting from a second injector a selective reducing agent and additional overfire air into the flue gas flowing through the vessel, wherein the second injection is at a level in the burnout zone downstream of the first injector and downstream of oxidation of the carbon monoxide by overfire air from the first injector; and
   d) reacting the selective reducing agent with the flue gas to reduce the nitrogen oxides.

2. A method as in claim 1 wherein the initial and additional overfire air is provided from an overfire chamber adjacent the vessel and said chamber has an upstream injector defining the first injector of the initial overfire air and a downstream injector defining a second injector of the additional overfire air, and a nozzle for injecting the selective reducing agent extends through the downstream injector.

3. A method as in 1, wherein the initial and additional overfire air is provided from an overfire chamber adjacent the vessel, and said chamber has a plurality of upstream injectors defining the first injector of the initial overfire air and a downstream injector of the additional overfire air through which extends a nozzle for injecting the selective reducing agent.

4. A method as in claim 3 wherein a separator plate in the overfire chamber separates the upstream injectors from the downstream injector.

5. A method as in claim 3 wherein a vertical distance separates the upstream injectors from the downstream injector.

6. A method as in claim 1 wherein said selective agent is injected as gas.

7. A method as in claim 1 wherein a temperature of the combustion gas is no hotter than 2500 degrees Fahrenheit and no cooler than 1700 degrees Fahrenheit at a level of the burnout zone where the selective agent is injected.

8. A method of minimizing discharge of nitrogen oxides from a combustion vessel having a substantially vertical gas path for flue gases, the method comprising:
   generating flue gases by combusting fuel, wherein the flue gases flow upwards along the gas path and through the vessel;
   releasing overfire air at a first elevation in the combustion vessel;
   oxidizing carbon monoxide in the flue gas with the overfire air released at the first elevation;
   at a second elevation in the combustion vessel above the first elevation and above where at least a portion of the carbon monoxide is oxidized by the overfire air, releasing a reducing agent and additional overfire air into the flue gas;
   in the gas path at above the second elevation, reducing nitrogen oxides in the flue gas by reacting the nitrogen oxides with the reducing agent released in the flue gas.

9. A method as in claim 8 wherein a mass flow of the first overfire air stream is at least four (4) times greater than a mass flow of the second overfire air stream.

10. A method as in claim 8 further wherein the reducing agent is injected through a nozzle discharging into the second overfire air stream.

11. A method as in claim 10 wherein the nozzle discharges as the second overfire airstream is released into the flue gases.

12. A method as in claim 8 wherein the reducing agent is released to the flue gases where the flue gases are in a temperature range of 1,700 degrees Fahrenheit to 2,500 degrees Fahrenheit.

13. A method of minimizing discharge of nitrogen oxides from a combustion boiler, the method comprising:
   spraying a reducing agent into an overfire air stream;
   supplying the overfire air stream and the sprayed reducing agent to the combustion boiler;
   dividing an overfire air duct supplying overfire air to the combustion boiler into a lower overfire air stream and an upper overfire air stream, and
   injecting the reducing agent into the upper overfire air stream and not into the lower overfire air stream.

14. The method according to claim 13, further comprising wherein a majority of the divided overfire air stream is in the lower overfire air stream.

15. The method according to claim 13, further comprising providing a reducing agent injection nozzle in the upper overfire air stream to inject the reducing agent.

16. The method according to claim 13 wherein the nozzle injects the reducing agent in liquid form into the upper overfire air stream.

17. The method according to claim 13 wherein the reducing agent with the upper overfire air enters the flue gas where the flue gas is in a temperature range of 1,700 degrees Fahrenheit to 2,500 degrees Fahrenheit.

* * * * *